US011128532B2

(12) United States Patent
Gupta et al.

(10) Patent No.: US 11,128,532 B2
(45) Date of Patent: Sep. 21, 2021

(54) SECURELY REPLACING EXISTING IP PHONE WITH NEW IP PHONE USING EXISTING DIRECTORY NUMBER AND WITHOUT ENABLING AUTO-REGISTRATION ON CALL CONTROL SERVER

(71) Applicant: Cisco Technology, Inc., San Jose, CA (US)

(72) Inventors: Ajay Kumar Gupta, Morrisville, NC (US); Basant Kumar Basavaraj, Richardson, TX (US); Pandit Panburana, Cary, NC (US)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/782,269

(22) Filed: Feb. 5, 2020

(65) Prior Publication Data

US 2021/0243077 A1 Aug. 5, 2021

(51) Int. Cl.
*H04L 12/28* (2006.01)
*H04L 12/24* (2006.01)
(Continued)

(52) U.S. Cl.
CPC .......... *H04L 41/084* (2013.01); *H04L 41/082* (2013.01); *H04L 61/2007* (2013.01); *H04L 63/083* (2013.01); *H04L 65/1006* (2013.01); *H04L 65/1073* (2013.01); *H04L 67/02* (2013.01); *H04W 8/18* (2013.01); *H04W 12/033* (2021.01); *H04W 76/10* (2018.02); *H04L 61/6022* (2013.01)

(58) Field of Classification Search
None
See application file for complete search history.

(56) References Cited

U.S. PATENT DOCUMENTS 7,567,552 B2 7/2009 Lee et al.
7,945,036 B1 5/2011 Tonogai et al.
(Continued)

OTHER PUBLICATIONS

Cisco, "Connecting Your Phone", 6 pages. retrieved from Internet Nov. 12, 2019; https://www.cisco.com/en/US/docs/voice_ip_comm/cuipph/7920/5_0/english/user/guide/7920con.html.

*Primary Examiner* — Phuongchau Ba Nguyen
(74) *Attorney, Agent, or Firm* — Edell, Shapiro & Finnan, LLC

(57) ABSTRACT

A call control entity communicates with Internet Protocol (IP) phones over a network. Responsive to a request from a new IP phone that is to replace an existing IP phone, the call control entity determines there is no existing IP phone record for the new IP phone. In response, the call control entity acquires from the new IP phone a directory number associated that is to be used when making calls with the new IP phone, and searches for an existing IP phone record for the existing IP phone based on the directory number. When the existing IP phone record is found, the call control entity creates for the new IP phone a new IP phone record associated with the directory number, copies existing configuration information from the existing IP phone record to the new IP phone record, and configures the new IP phone with the existing configuration information.

20 Claims, 11 Drawing Sheets

(51) Int. Cl.
  *H04L 29/12* (2006.01)
  *H04W 76/10* (2018.01)
  *H04L 29/08* (2006.01)
  *H04W 8/18* (2009.01)
  *H04L 29/06* (2006.01)
  *H04W 12/033* (2021.01)

(56) References Cited

U.S. PATENT DOCUMENTS

| | | | |
|---|---|---|---|
| 8,144,692 B2 * | 3/2012 | Haddad | H04L 41/0806 370/352 |
| 8,315,876 B2 | 11/2012 | Reuss | |
| 8,732,279 B2 | 5/2014 | Nedeltchev et al. | |
| 8,819,188 B2 | 8/2014 | Blatherwick et al. | |
| 9,065,684 B2 | 6/2015 | Tanizawa et al. | |
| 9,160,863 B2 | 10/2015 | Morrison et al. | |
| 9,549,259 B2 | 1/2017 | Reuss | |
| 9,717,106 B2 | 7/2017 | Bell et al. | |
| 2016/0294748 A1 * | 10/2016 | Yang | G06Q 50/01 |
| 2019/0082477 A1 * | 3/2019 | Burton | H04W 76/11 |

\* cited by examiner

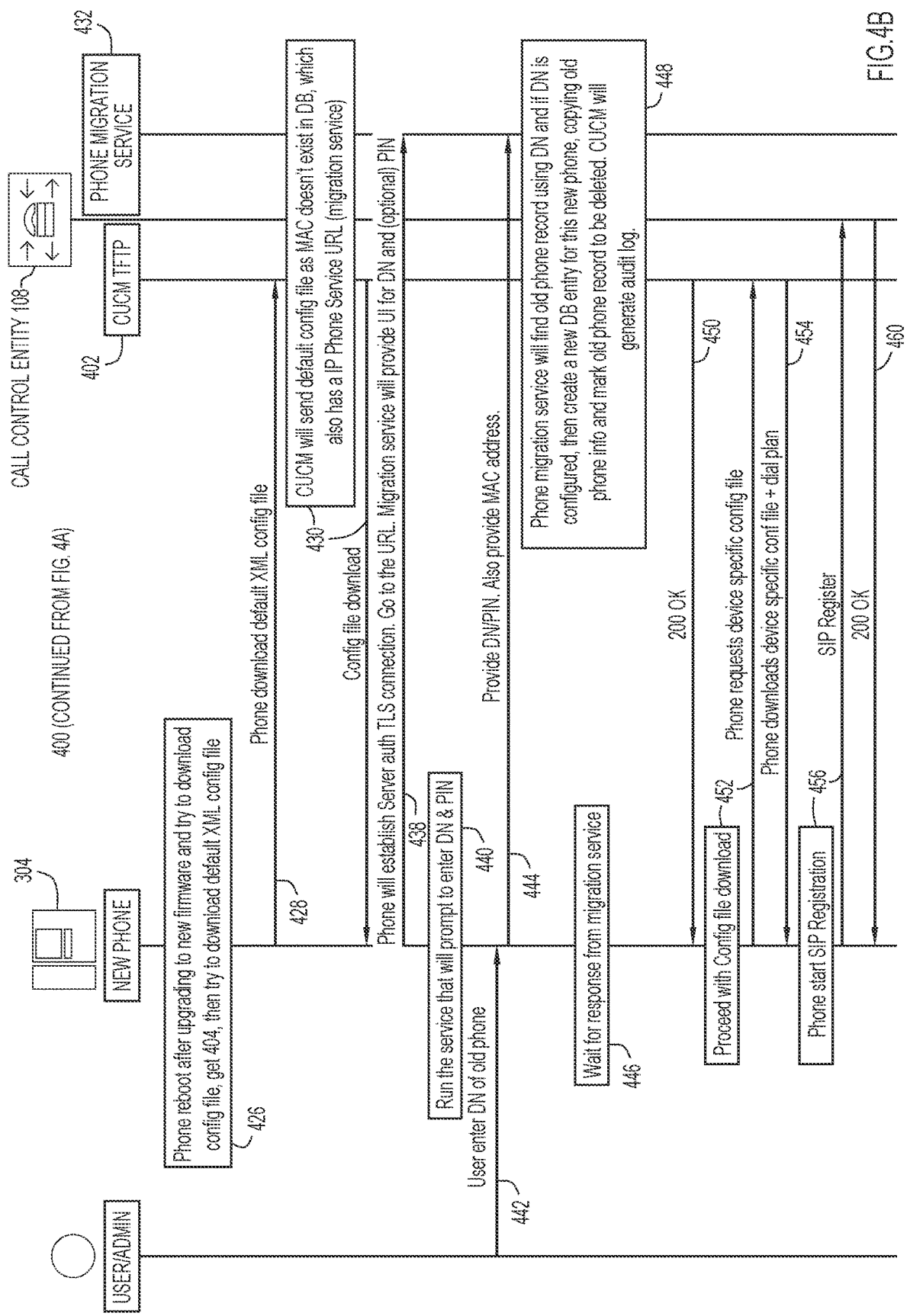

SECURELY REPLACING EXISTING IP PHONE WITH NEW IP PHONE USING EXISTING DIRECTORY NUMBER AND WITHOUT ENABLING AUTO-REGISTRATION ON CALL CONTROL SERVER

TECHNICAL FIELD

The present disclosure relates to replacing Internet Protocol (IP) phones.

BACKGROUND

An Internet Protocol (IP) phone, also referred to as a voice-over-IP (VoIP) phone, communicates with other IP phones over the Internet via an exchange of IP packets with the other IP phones. There are many reasons why the IP phone may need to be replaced. For example, the IP phone may no longer be functional, or the type or model of the IP Phone (i.e., the IP phone model) may no longer be supported by its vendor due expiry of an end-of-support date. The IP phone may be replaced with a new IP phone using a conventional technique, which readies the new IP phone for service. For example, the new IP phone may perform unsecure (i.e., non-secure) auto-registration to register itself with a conventional call control server. Unsecure auto-registration disadvantageously requires that auto-registration be enabled on the call control server; however, some call control servers do not support the auto-registration. The unsecure auto-registration also exposes sensitive IP phone configuration information and user information when the new IP phone registers with the call control server. Another IP phone replacement strategy includes pre-configuring IP phones on the call control server, which is a complicated and time-consuming process that uses manual intervention.

BRIEF DESCRIPTION OF THE DRAWINGS

FIGS. 4A and 4B collectively represent a transaction diagram for detailed transactions used to simplify the replacement of the existing IP phone with the new IP phone based on the directory number, according to an example embodiment.

DESCRIPTION OF EXAMPLE EMBODIMENTS

Overview

In one embodiment, a call control entity is configured to communicate with Internet Protocol (IP) phones over a network. Responsive to a configuration request from a new IP phone that is to replace an existing IP phone, the call control entity determines there is no existing IP phone record for the new IP phone. In response to the determination, the call control entity acquires from the new IP phone a directory number associated with a user and that is to be used when making calls with the new IP phone. The call control entity searches for an existing IP phone record for the existing IP phone based on the directory number. When the existing IP phone record for the existing IP phone is found, the call control entity creates for the new IP phone a new IP phone record associated with the directory number, and copies existing configuration information from the existing IP phone record to the new IP phone record. The call control entity configures the new IP phone with the existing configuration information.

Example Embodiments

Embodiments presented herein use a directory number (which may include an extension number), assigned to a user and used to make IP phone calls on IP phones, as a key to simplify IP phone replacement in a secure manner. In the embodiments, a call control entity creates a new IP Phone record of a new IP phone in a local call control database based on an existing IP phone record for an existing IP phone found using the directory number. The embodiments work with or without unsecure auto-registration, and avoid an administrator burden of pre-configuring IP phones in the call control entity. Auto-registration is a process by which a call control entity accepts registration of any new IP phone, and assigns to any IP phone requesting the registration a respective directory number from a range of available directory numbers at the call control entity. With auto-registration, the call control entity provides the assigned directory number to the IP phone in a non-secure manner.

Figure 1:
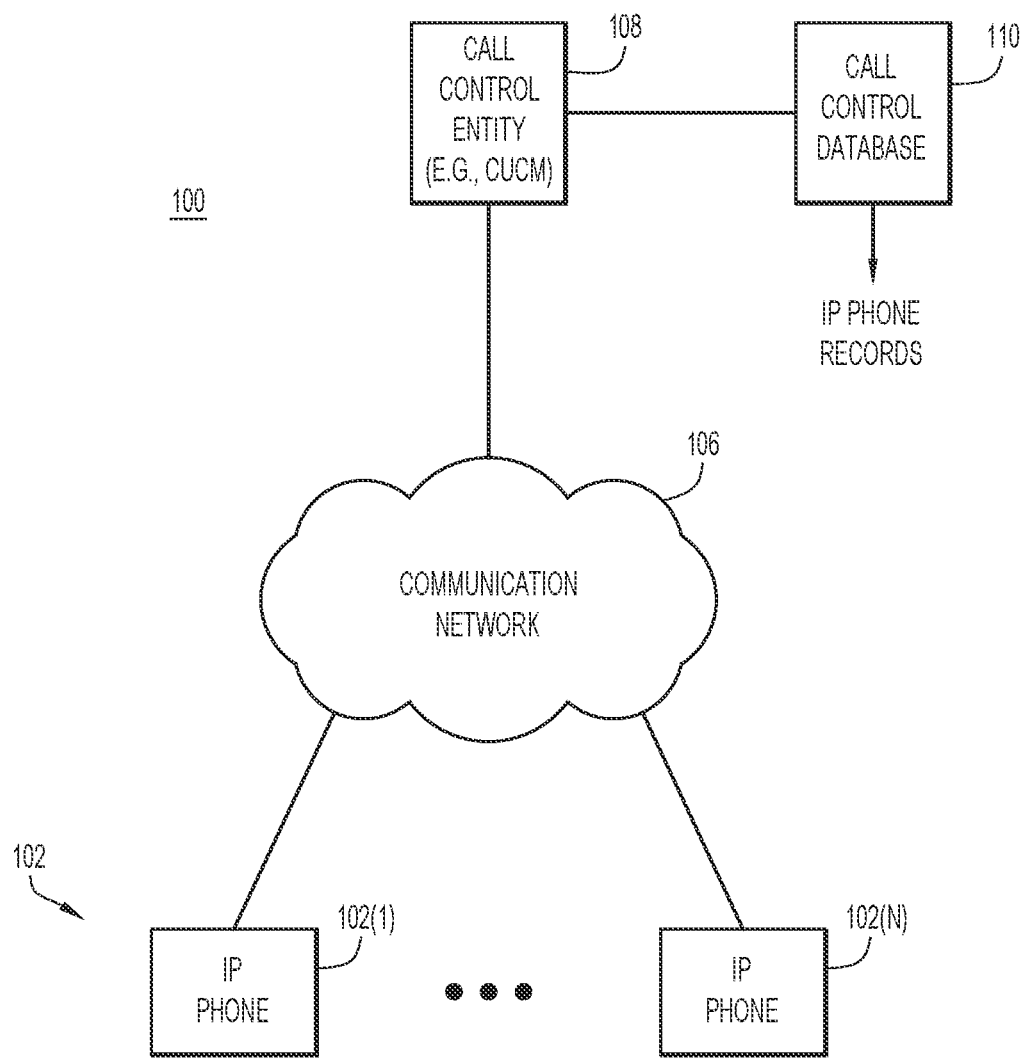
FIG. 1 is a block diagram of a network environment in which embodiments directed to simplifying IP phone replacement in a secure manner may be implemented, according to an example embodiment.

With reference to FIG. 1, there is shown an example network environment 100 in which embodiments directed to simplifying IP phone replacement in a secure manner may be implemented. Network environment 100 includes Internet Protocol (IP) phones (also referred to as voice-over-IP (VoIP phones) 102(1)-102(N) (collectively, "IP phones 102") associated with and operated by respective users. IP phones 102 may include desk phones and mobile phones. IP phones 102 are configured to connect with and communicate over a communication network 106, which may include one or more wide area networks (WANs), such as the Internet, and one or more local area networks (LANs), for example. Network environment 100 also includes a call control entity 108 (also referred to as a "call manager 108" or a "call control server 108") configured to connect to communication network 106 and communicate with IP phones 102 over the communication network. Call control entity 108 includes one or more call control servers that host applications to collectively implement a communication infrastructure to host services that provide provisioning/registering of IP phones 102, call control methods, and session management methods for the IP phones, once provisioned/registered on the call control entity. In an example, call control entity 108 may include one or more components of a Cisco Uniform Communication Manager (CUCM) configured to implement the embodiments presented herein.

Figure 2:
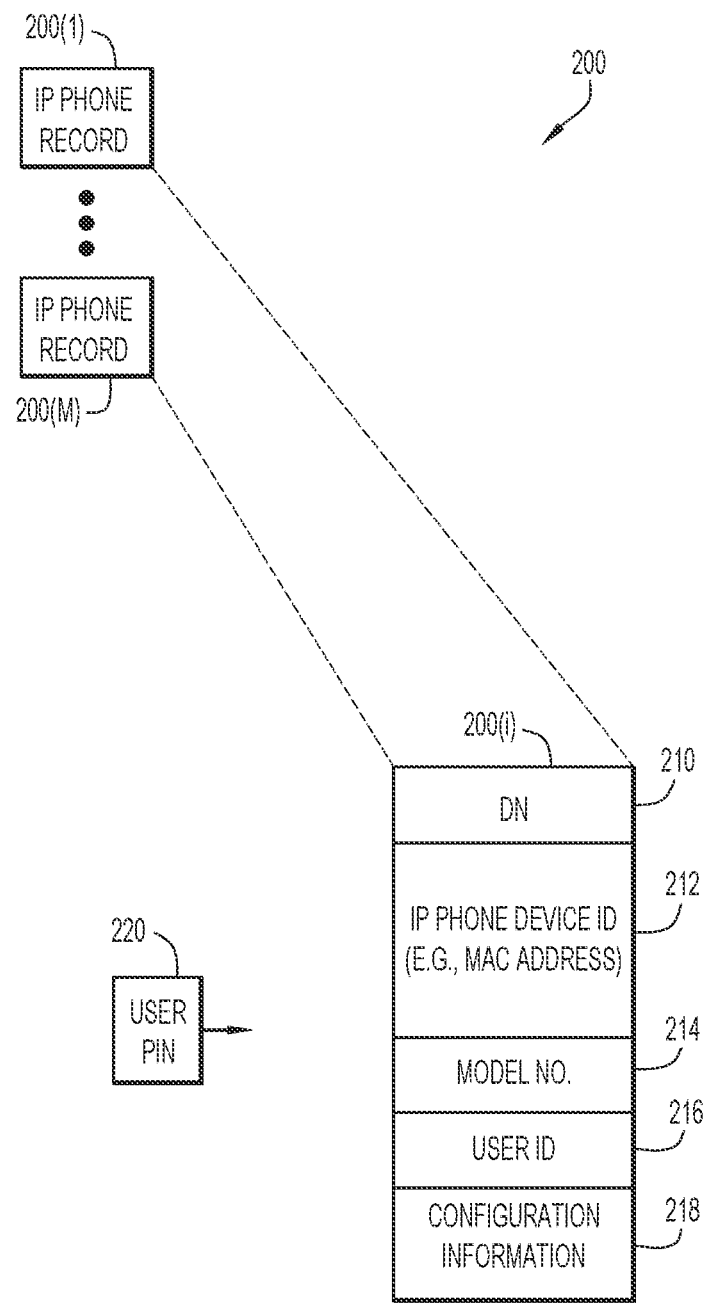
FIG. 2 is an illustration of example IP phone records stored in a call control database accessible to a call control entity of the network environment, according to an example embodiment.

Call control entity 108 includes a call control database 110 to store IP phone records for various ones of IP phones 102 provisioned on/registered with the call control entity. Provisioning an IP phone on call control entity 108 includes, but is not limited to, creating a corresponding IP phone record for the IP phone in call control database 110. With reference to FIG. 2, there is an illustration of example IP phone records 200(1)-200(M) (collectively referred to as "IP phone records 200") stored in call control database 110 for corresponding ones of IP phones 102 registered with control entity 108. Each IP phone record 200(i) corresponds to one of IP phones 102 and is associated with a corresponding user. Each IP phone record 200(i) includes: a directory number (DN) (also referred to as a "phone number") 210 assigned to the user associated with the IP phone record; an IP phone device identifier (ID) 212, such as media access control (MAC) address of the IP phone corresponding to the IP phone record and that is registered with call control entity 108; a model number 214 of the IP phone; a user ID 216 of the user; and IP phone configuration information 218 associated with the user and the IP phone and that may be used to configure the IP phone for operation. Generally, the fact that a directory number and an IP phone have been assigned to a user is evidence by the presence of the directory number and the user identifier of the user in, or otherwise associated with, the IP phone record for the IP phone. IP phone record 200(i) is shown by way of example, and the IP phone record may include more or less information. For example, directory number 210 may be omitted from the IP phone record itself, and used instead as an index or pointer to the IP phone record.

For purposes of security controlled access to IP phone record 200(i), call control database 110 may also store, and associate with the IP phone record, a predetermined personal identification number (PIN) 220 that is assigned to the user. In this case, call control entity 108 uses the user PIN to control or condition access to IP phone record 200(i) based on the user PIN, e.g., the call control entity permits access to the IP phone record only when the user PIN 220 has been presented to the call control entity.

Director number 210 assigned to the user is used to make phone calls with the IP phone, as is known. Directory number 210 may be stored in multiple (different) IP phone records corresponding to multiple (different) IP phones, and thus used to make phone calls with each of the multiple IP phones. Access to the multiple IP phone records may be controlled based on the user PIN (e.g., user PIN 220) assigned to the user who is associated with each of the IP phone records. MAC address 212 is typically unique to the IP phone represented by the IP phone record. The collection of directory number 210, MAC address 212, and user ID 216 in IP phone record 200(i) associates the user, the directory number, and the IP phone to each other.

IP phone configuration information 218 includes IP phone configuration parameters/settings used to configure the IP phone. IP phone configuration information 218 includes user settings for options such as speed-dialing, call-forwarding, and the like. IP phone configuration information 218 includes administration settings, such as security settings, class-of-service settings, and the like. Thus, in an example, IP phone configuration information 218 includes custom IP phone configuration parameters associated with (and usually defined by) the user and that follow the user from one IP phone to another IP phone used by the user, and standard IP phone configuration parameters that are not specifically associated with the user. Examples of IP phone configuration information 218 include, but are not limited to, one or more of an IP phone button template, an IP phone soft-key template, IP phone default parameters, an IP phone profile, an IP phone recording profile, and a user identifier.

The embodiments presented below simplify the replacement of an existing IP phone (also referred to as an "old IP phone") with a new IP phone. At the time of replacement, the existing IP phone has already been provisioned/registered on/with call control entity 108 and, therefore, an existing IP phone record for the existing IP phone is stored in call control database 110. On the other hand, at the time of replacement, the new IP phone has not yet been provisioned/registered on/with call control entity 108 and, therefore, there is no new IP phone record for the new IP phone stored in call control database 110. The new IP phone and the existing IP phone may be referred to as a "first IP phone" and a "second IP phone," respectively.

Figure 3:
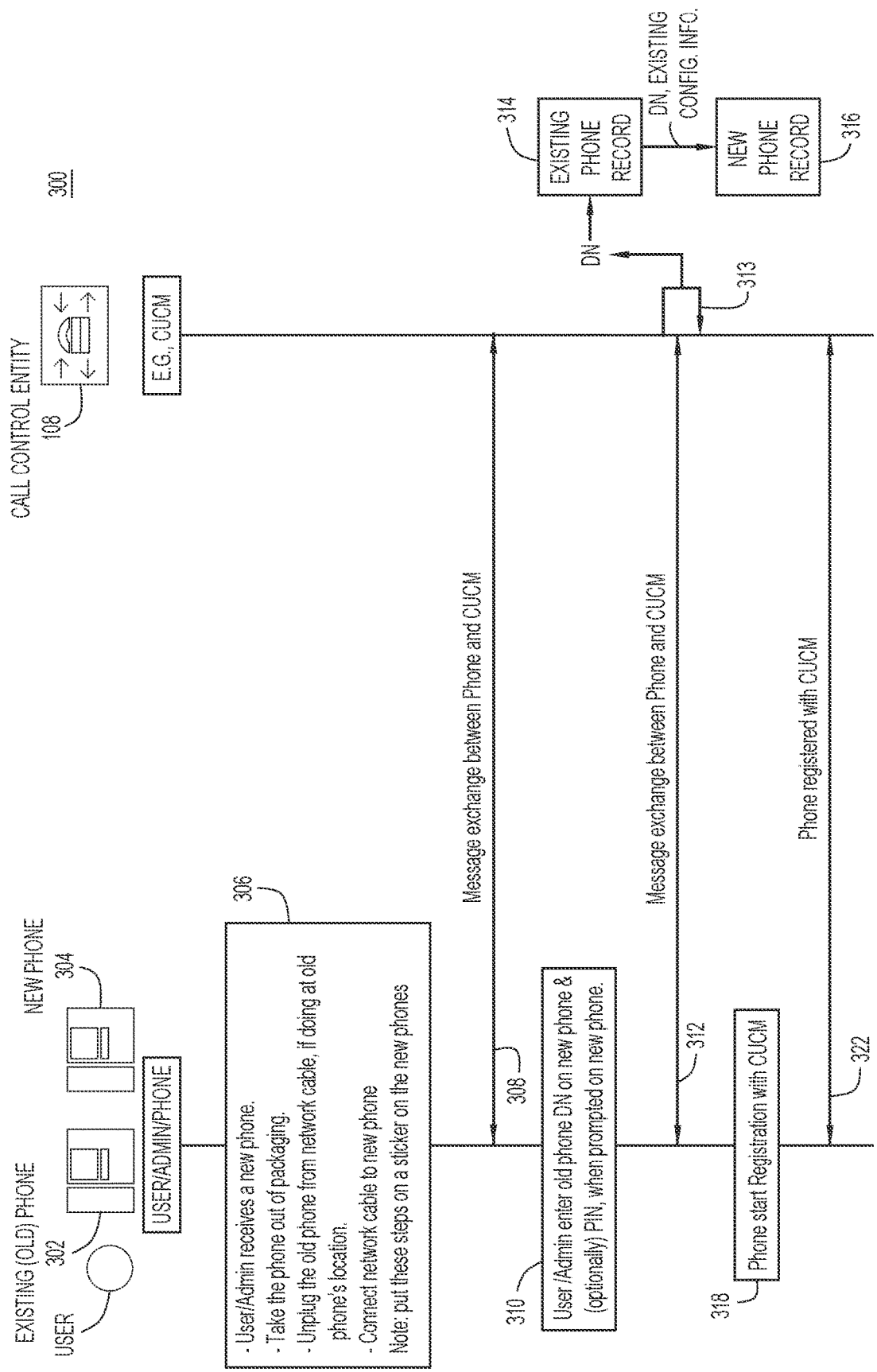
FIG. 3 is a transaction diagram for high-level transactions used to simplify replacement of an existing IP phone with a new IP phone based on a directory number assigned to a user and used to make phone calls with the IP phones, according to an example embodiment.

With reference to FIG. 3, there is a transaction diagram of example high-level transactions 300 used to simplify replacement of an existing (or "old") IP phone 302 registered with call control entity 108 (e.g., the CUCM) with a new IP phone 304 based on a predetermined directory number assigned to a user and used to make phone calls with the IP phones. Thus, initially, the directory number is associated with the user and the existing IP phone 302. In the ensuing description and in the figures, "IP phone" may be replaced with simply "phone."

Existing phone 302 may or may not be active with call control entity 108 during the replacement process with the new phone 304, and, in one example, may have been removed physically from its initial location of deployment prior to the commencement of the replacement process; however, in the example of FIG. 3, the existing phone 302 is available and connected with communication network 106 when the replacement process begins. At 306, a user (or phone administrator) physically receives the new phone 304 that is to replace the existing phone 302. The existing phone 302 includes a network connection cable that is connected to a local connector, such as an Ethernet connector, proximate the existing phone and through which the existing phone accesses communication network 106. The user disconnects, i.e., unplugs, the existing phone 302 from the local connector. The user connects, i.e., plugs, a network connection cable of the new phone 304 into the local connector so that the new phone 304 can access communication network 106.

At 308, the new phone 304 exchanges initial messages with call control entity 108 over communication network 106. Call control entity 108 provisions the new phone 304 with default configuration information in the initial messages. This may include generic configuration information for any IP phone.

At 310, the new phone 304 executes instructions included in the default configuration information. The instructions cause the new phone 304 to generate a prompt for the user to enter the directory number associated with the existing phone, and optionally a user PIN or other authentication code. The prompt may be a display prompt, or a voice prompt, for example. In response to the prompt, the user enters the directory number and the user PIN (if prompted for the user PIN) through a keypad of the new phone 304, or using voice commands through a microphone of the new phone, for example.

At 312, responsive to entry of the above-mentioned information at the new phone 304, a secure connection is established between new phone 304 and call control entity 108. The new phone 304 exchanges further messages with call control entity 108 over the secure connection. Either call control entity 108 or new phone 304 may initiate establishment of the secure connection using any known or hereafter developed technique for establishing the secure connection. For example, the technique may rely on a phone manufacturing-installed certificate as an authentication credential, and/or a root trust certificate that is pre-installed, or that is retrieved through some secure means on the phone, to authenticate a call control server of call control entity 108. In the further messages, the new phone 304 provides the directory number and, optionally, the user PIN when available, to call control entity 108. When available, the user PIN may be used for both authenticating call control entity 108 and the user.

At 313, using the directory number, call control entity 108 searches IP phone records 200 for an existing IP phone record 314 for the existing phone 302 stored in call control database 110. The searching finds the existing IP phone record because the existing IP phone record includes (or is indexed by) the directory number. Also at 313, when the existing IP phone record is found, call control entity 108 creates a new IP phone record 316 for the new phone 304 and copies existing IP phone configuration information associated with the user from existing IP phone record 314 to the new IP phone record. Call control entity 108 may also automatically adjust certain configuration settings of the IP phone configuration information to suit the new phone 304. This enables proper configuration of the new phone 304 when the model of the new phone is different than the model of the old phone 302.

Call control entity 108 sends the existing IP phone configuration information to the new phone 304 in the further messages (included in message exchange 312).

At 318, the new phone 304 configures itself with the existing IP phone configuration information and initiates registration with call control entity 108. At 322, the new phone 304 exchanges registration messages with call control entity 108 over the secure connection to complete registration with the call control entity.

Figure 4A:
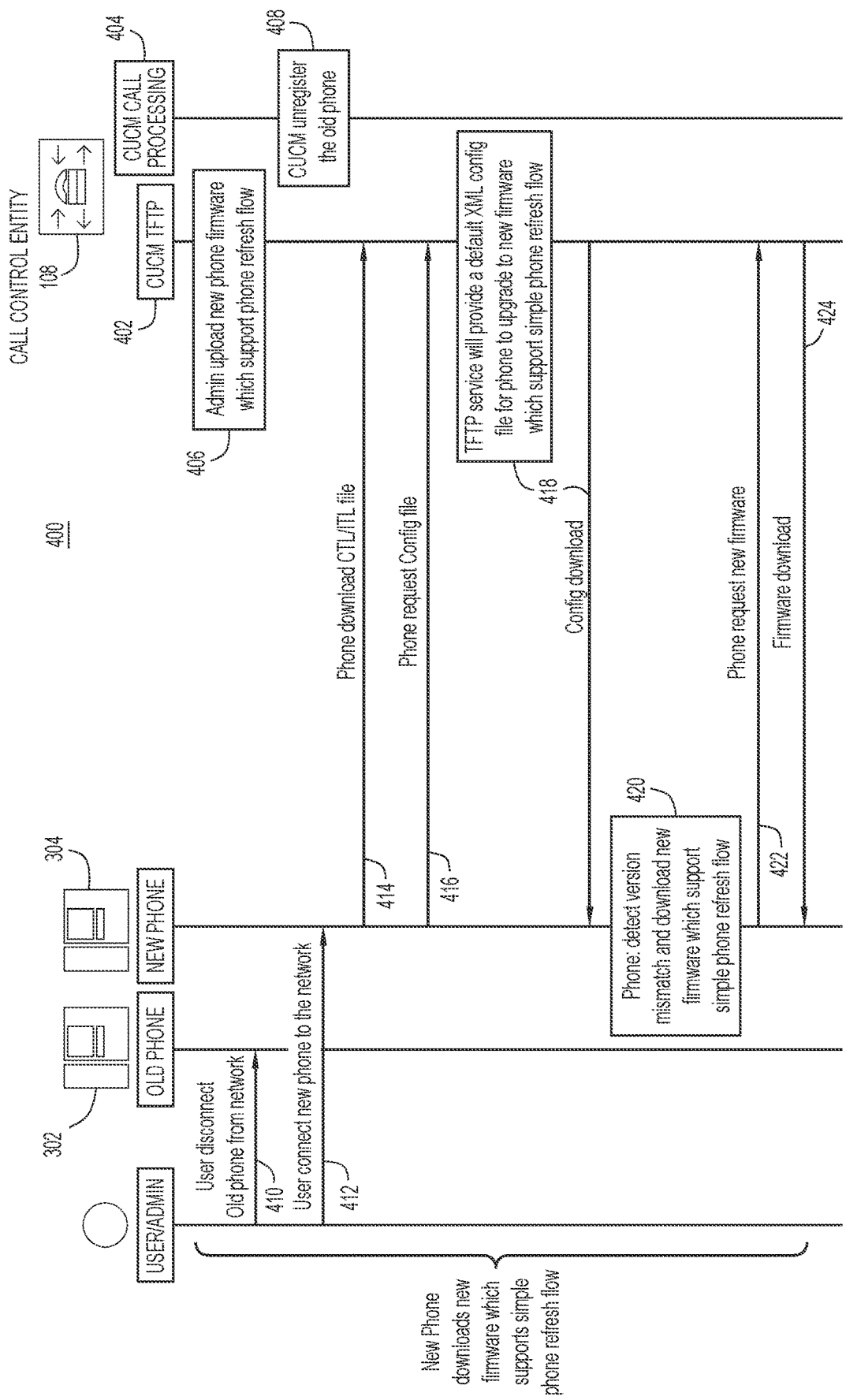

With reference to FIGS. 4A and 4B, there is a transaction diagram that shows example detailed transactions 400 used to simplify the replacement of existing phone 302 with new phone 304 in a secure manner based on the directory number. Detailed transactions 400 (which include both operations and messages) expand on high-level transaction 300 described above in connection with FIG. 3. In the example of FIGS. 4A and 4B, call control entity 108 includes a CUCM Trivial File Transfer Protocol (TFTP) service/server 402 (simply referred to as "TFTP 402") and a CUCM call processing module 404 (simply referred to as "Call Processing" 404).

Referring first to FIG. 4A, at 406, an administrator uploads to call control entity 108 (e.g., TFTP 402) new phone firmware, which supports a new phone refresh flow, i.e., initial processing for new phone 304. At 408, call control entity 108 (e.g., Call Processing 404) unregisters existing phone 302 from the call control entity.

At 410, the user disconnects existing (or "old") phone 302 from communication network 106, and at 412, connects new phone 304 to the communication network, as described above.

At 414, new phone 304 downloads a Certificate Trust List (CTL) and Identity Trust List (ITL) file from call control entity 108. For example, call control entity 108 (e.g., TFTP 402) sends the CTL/ITL file to new phone 304. At 416, new phone 304 sends, and call control entity 108 (e.g., TFTP 402) receives from the new phone, a first configuration request for a configuration file with which to configure the new phone. The first configuration request includes a new MAC address of the new phone that differs from an existing MAC address of the existing phone. The new MAC address is not known to call control entity because the new phone has not yet been configured on the call control entity. Responsive to the first configuration request, and because the new MAC address is not known to call control entity 108, at 418, the call control entity (e.g., TFTP 402) sends to new phone 304 a default/common configuration file (e.g., an Extensible Markup Language (XML) file) for the phone to upgrade to the new firmware, which supports the phone refresh flow. Phone refresh is the process of migrating existing IP phone configuration information from existing phone 302 to new phone 304, as described below.

At 420, new phone 304 receives and executes the default configuration file, and determines there is a version mismatch between current firmware in the new phone and a new version of firmware that is available for the new phone.

At 422, new phone 304 sends, and call control entity 108 (e.g., TFTP 402) receives, a firmware request for the new firmware. In response, at 424, call control entity 108 (e.g., TFTP 402) sends the new firmware to new phone 304, which receives the new firmware.

Referring to FIG. 4B, at 426, new phone 304 receives and upgrades to the new firmware. Next, new phone 304 unsuccessfully attempts to download a configuration file with which to configure the new phone, and thus receives an error message (e.g., HyperText Transfer Protocol (HTTP) 404—page/server not found). Responsive to the error message, at 428, new phone 304 sends to call control entity 108 (e.g., TFTP 402) a second configuration request for a default configuration file. The second configuration request also includes the new MAC address of new phone 304. Call control entity 108 receives the second configuration request.

Responsive to the second configuration request, at 430, call control entity 108 searches IP phone records 200 in call control database 110 for an existing IP phone record that includes the new MAC address. Call control entity 108 does not find a match because new phone 304 has not yet been provisioned on/registered with the call control entity. That is, based on the new MAC address provided by the new phone, call control entity 108 determines there is no existing IP phone record for new phone 304 in call control database 110. In response, call control entity 108 accesses, and sends to new phone 304, a default configuration file configured to cause the new phone to execute a provisioning procedure for the new phone, as described below. The default configuration file provided by call control entity 108 includes a Uniform Resource Locator (URL) for a phone migration service 432 hosted/implemented on call control entity 108 and that new phone 304 is to access to become configured, as described below.

At 438, responsive to the new configuration file, new phone 304 establishes with call control entity 108 (e.g., phone migration service 432) a secure network connection over communication network 106, such as a server authorization Transport Layer Security (TLS) connection. Subsequent message exchanges among next transactions 440-460 are performed over the secure network connection. Also at 438, new phone 304 executes the URL to access/request a resource, e.g., a Webpage, from phone migration service 432. In response, call control entity 108 (e.g., phone migration service 432) provides to new phone 304 user interface (UI) information/instructions that, when executed by the new phone, cause the new phone to generate a prompt to the user to enter (i) the directory number associated with the user and that is to be used to make calls with the new phone, and (ii) optionally, the user PIN. For example, call control entity 108 provides a UI to the new phone and that is configured to prompt the user to enter the information.

At 440, new phone 304 executes the UI information/instructions. As a result, new phone 304 displays the prompt for entry of the directory number and, optionally, the user PIN. Responsive to the prompt, at 442, the user enters the directory number and the user PIN, when present. In response to entry of this information, at 444, new phone 304 provides the directory number and user PIN (when available) to call control entity 108, (e.g., phone migration service 432) which receives the information. At 446, new phone 304 waits for a response from call control entity 108.

At 448, call control entity 108 (e.g., phone migration service 432) searches IP phone records 200 in call control database 110 for an existing IP phone record that includes (or is indexed by) the directory number. As a result of the search, call control entity 108 finds an existing IP phone record (e.g., existing IP phone record 314) for existing phone 302. When call control entity 108 finds/identifies the existing IP phone record, the call control entity creates a new IP phone record (e.g., new IP phone record 316) for new phone 304 in call control database 110. Call control entity 108 copies existing IP phone configuration information from the existing IP phone record into the new IP phone record, optionally adjusts configuration settings to suite the new phone 304, and marks the existing IP phone record for deletion. Call control entity 108 generates an audit log to record the aforementioned events/transactions. At 450, call control entity 108 generates and sends to new phone 304 a status message indicating success (e.g., an HTTP 200—OK). New phone 304 receives the status message indicating success.

Responsive to receipt of the status message indicating success, at 452, new phone 304 generates and sends to call control entity 108 a third configuration request for specific IP phone configuration information with which to configure the new phone, and call control entity 108 receives the third configuration request.

Responsive to receipt of the third configuration request, at 454, call control entity 108 sends to new phone 304 the existing IP phone configuration information from the existing IP phone record, along with a dial plan. For example, call control entity 108 may generate a configuration file including the aforementioned information, and send the configuration file to new phone 304. New phone 304 receives the existing IP phone configuration information and dial plan. The existing configuration includes the information listed above in connection with FIG. 2. New phone 304 configures itself with the existing IP phone configuration information.

Responsive to receipt of the existing IP phone configuration information and dial plan, at 456, new phone 304 initiates Session Initiation Protocol (SIP) registration with call control entity 108 and exchanges messages with the call control entity to complete the registration of the new phone with the call control entity. SIP registration enables new phone 304 to make and receive calls using the directory number. When SIP registration is complete, at 460, call control entity 108 generates and sends to new phone 304 a status message indicating success (e.g., an HTTP 200—OK).

Figure 5A:
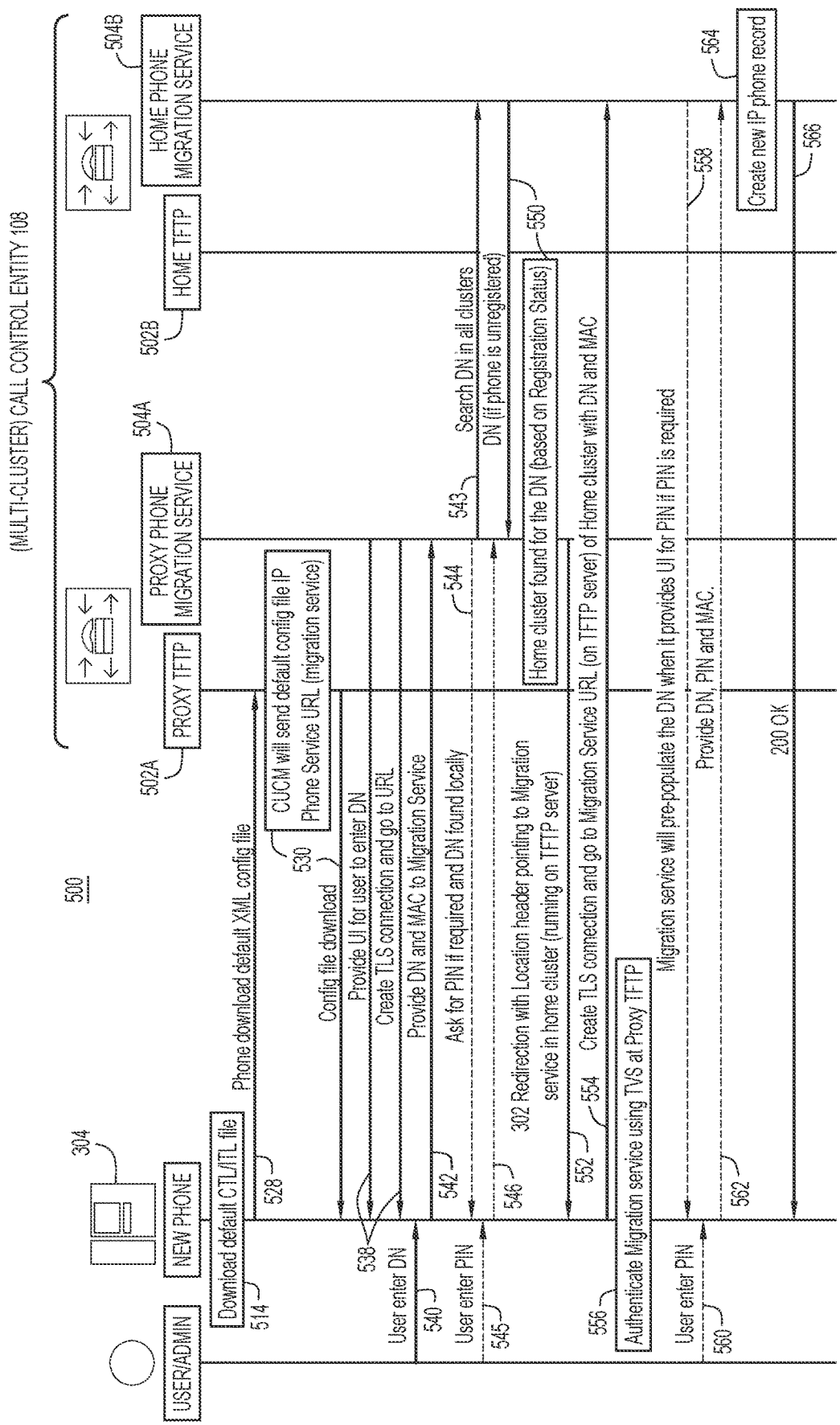
FIGS. 5A and 5B collectively represent a transaction diagram for detailed transactions used to simplify the replacement of the existing IP phone with the new IP phone based on the directory number when the call control entity stores IP phone records across multiple clusters of the call control entity, according to an example embodiment.
Figure 5B:
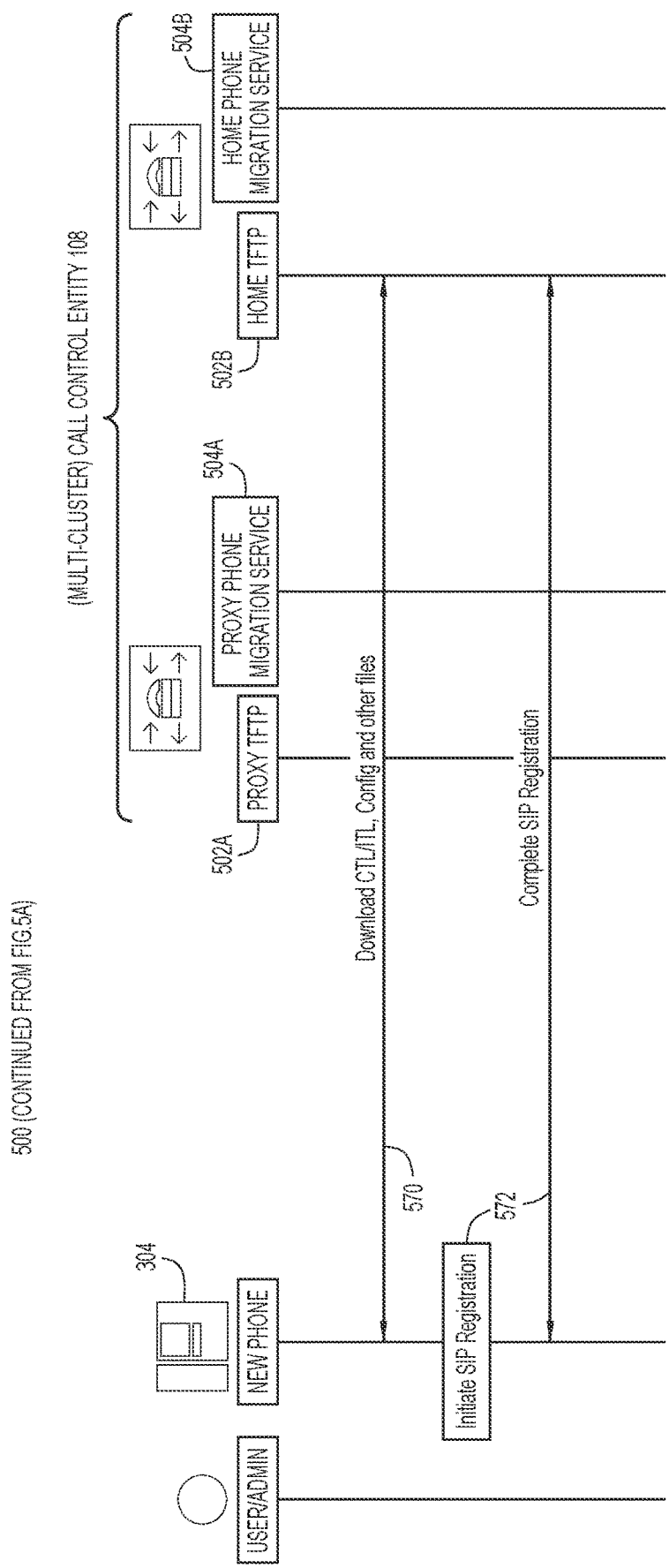

With reference to FIGS. 5A and 5B, there is a transaction diagram for example detailed transactions 500 used to simplify the replacement of the existing phone with the new phone based on the directory number when call control entity 108 includes multiple clusters that store IP phone records. In the example of FIGS. 5A and 5B, call control entity 108 includes a proxy TFTP service/server 502A (referred to simply as proxy TFTP 502A) and a proxy phone migration service 504A associated with/local to TFTP 502A, which together represent a first/proxy cluster. In addition, call control entity 108 includes a home TFTP service/server 502B (referred to simply as home TFTP 502B) and a home phone migration service 504B associated with home TFTP 502B, which together represent a second/home cluster.

Referring to FIG. 5A, at 514, similar to 414 described above, new phone 304 downloads a default CTL/ITL file from proxy TFTP 502A. At 528, similar to 428 described above, new phone 304 downloads a default configuration file responsive to sending to proxy TFTP 502A a configuration request including the new MAC address of new phone 304. At 530, similar to 430 described above, based on the new MAC address provided by the new phone, call control entity 108 (e.g., the proxy cluster) determines there is no existing IP phone record for new phone 304 in call control database 110. In response, call control entity 108 sends to new phone 304 a default configuration file configured to cause the new phone to execute a provisioning procedure for the new phone, as described below. The default configuration file provided by call control entity 108 includes a URL for proxy phone migration service 504A of the proxy cluster.

Responsive to instructions in the default configuration file, new phone 304 executes the URL to request UI information/instructions from proxy phone migration service 504A. In response to the request, at 538, proxy phone migration service 504A provides the UI information/instructions to new phone 304. Also, new phone 304 establishes a secure connection with proxy phone migration service 504A. In addition, new phone 304 prompts the user for a directory number.

At 540, the user enters the directory number into new phone 304. In response to entry of the directory number into new phone 304, at 542, the new phone sends to proxy phone migration service 504A the directory number and the new MAC address of the new phone. Upon receiving the directory number and the new MAC address from new phone 304, at 543, call control entity 108 searches all available clusters, beginning with the proxy cluster, for the existing IP phone record that includes the directory number. For example, call control entity 108 searches across proxy TFTP 502A (e.g., the proxy cluster) and home TFTP 502B (e.g., the home cluster).

If the existing IP phone record is found locally to proxy phone migration service 504A (e.g., on the local cluster corresponding to proxy TFTP 502A), at 544, the proxy phone migration service optionally sends to new phone 304 a request for the user PIN. Upon receiving the request for the user PIN, new phone 304 prompts the user for the user PIN. Upon entry of the user PIN at new phone 304 at 545, at 546, the new phone sends the user PIN to proxy phone migration service 504A. Upon receiving the user PIN and correctly matching the user PIN to a predetermined user PIN, proxy phone migration service 504A creates the new phone record for new phone 304, and sends the existing IP phone configuration information to the new phone as described above.

On the other hand, if the existing IP phone record is found locally to home phone migration service 504B (e.g., on home TFTP 502B) instead of locally to proxy phone migration service 504A, at 550, the home phone migration service signals to the proxy phone migration service that a home cluster has been found for the directory number. The signal also indicates the identity of the found home cluster. In response, at 552, proxy phone migration service 504A sends to new phone 304 a redirect to home phone migration service 504B.

Upon receiving the redirect, at 554, new phone 304 establishes a secure connection with home phone migration service 504B, which has access to the existing IP phone record. At 556, new phone 304 authenticates home phone migration service 504B using a Trust Verification Service (TVS) at proxy TFTP 502A for example. The TVS assists the new phone 304 with verification of a certificate that it does not have in its possession or in local memory of the new phone.

At 558, home phone migration service 504B provides to new phone 304 UI interface information/instructions to cause the new phone to generate the above-mentioned prompts for the directory number, and optionally the user PIN. In an example in which the UI interface information/instructions solicit the user PIN, the UI interface information/instructions may pre-populate the prompt for the directory number with directory number acquired via transaction 542.

At 560, responsive to prompts at new phone 304, the user enters the user PIN and the directory number as prompted. At 562, new phone 304 sends to home phone migration service 504B the directory number, the new MAC address of the new phone, and the use PIN when available. Upon receiving the above-mentioned information from new phone 304, at 564, home phone migration service 504B creates (e.g., at the home cluster) the new IP phone record for the new phone from the existing IP phone record for the existing phone as described above. At 566, home phone migration service 504B sends to new phone 304 a status message indicating success.

Referring to FIG. 5B, at 570, similar to 452 described above, new phone 304 sends to home TFTP 502B a configuration request. Also, similar to 454 described above, responsive to receipt of the configuration request, home TFTP 502B sends to new phone 304 existing IP phone configuration information from the existing IP phone record for the existing IP phone. New phone 304 configures itself based on the existing IP phone configuration information.

At 572, new phone 304 initiates and completes SIP registration with call control entity 108.

The flow of FIGS. 5A and 5B (e.g., transactions 500) may include the following operations:
 a. Through a command line interpreter (CLI), for example, an administrator provides a directory number/(existing phone MAC) mapping onto the call control entity executing a proxy TFTP service.
 b. The new phone connects to a phone migration service.
 c. The user enters the directory number into the new phone.
 d. The phone migration service finds the MAC and sends a request to a proxy TFTP service to find the new phone's local cluster.
 e. The phone migration service redirects the new phone to its local cluster.
 f. Based on a local security configuration, the phone migration service provides to the new phone a screen prompt for a user to enter the user PIN.
 g. After successful authentication, the local phone migration service completes the new phone refresh.

Thus, the flow of FIGS. 5A and 5B include, in part:
 a. At a first cluster (e.g., a proxy cluster) of multiple clusters (e.g., a proxy cluster and a home cluster), establishing a first connection with the IP phone.
 b. Searching the multiple clusters for the existing IP phone record based on the directory number until the existing IP phone record is found.
 c. If the existing IP phone record is found on the first cluster (e.g., the home cluster), creating the new IP phone record on the first cluster.
 d. If the existing IP phone record is found on a second cluster (e.g., the home cluster) of the clusters: redirecting the new phone to the second cluster; and, at the second cluster, establishing a connection with the new phone, and performing the creating the new IP phone record on the second cluster.

Figure 6:
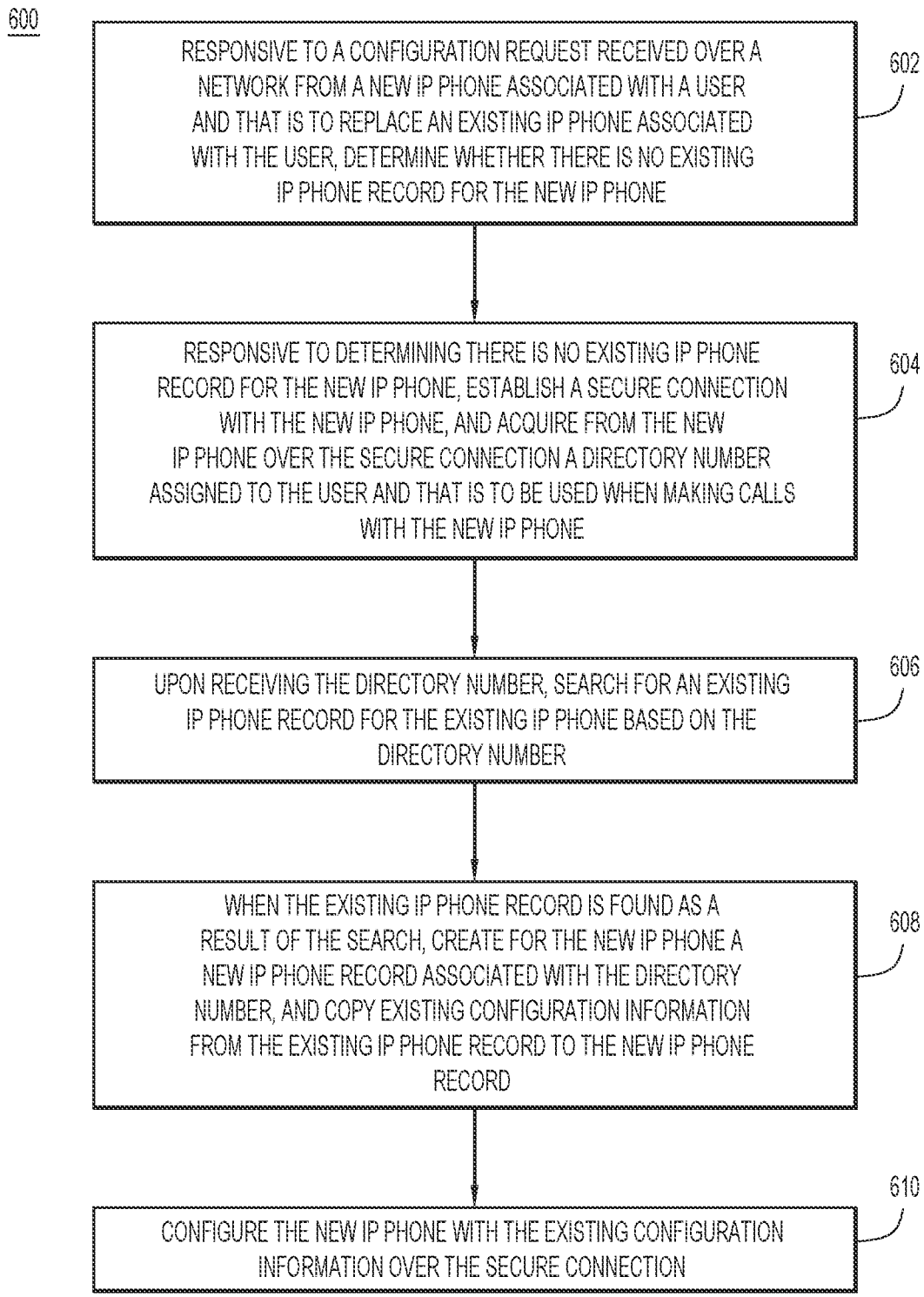
FIG. 6 is a flowchart of an example method of simplifying the replacement of the existing IP phone with the new IP phone based on the directory number, performed by the call control entity, according to an example embodiment.

With reference to FIG. 6, there is a flowchart of an example method 600 of simplifying the secure replacement of an existing IP phone (also referred to as a "second IP phone") that is provisioned/registered on/with call control entity 108 with a new IP phone (also referred to as a "first IP phone") that is not provisioned/registered on/with call control entity 108, based on a directory number assigned to a user and used to make calls with the existing IP phone, without performing conventional auto-registration. Method 600 is performed primarily by call control entity 108, and includes various operations/transactions described above.

At 602, responsive to a configuration request received over communication network 106 from the new IP phone, call control entity 108 determines whether there is no existing IP phone record for the new IP phone. The existing IP phone is associated with the user and the directory number. The directory number is to be used to make calls with the new IP phone. In an example, the configuration request includes a new device identifier (e.g., a MAC address) of the new IP phone that is different from an existing device identifier (e.g., a MAC address) of the existing IP phone, and call control entity 108 determines whether there is no existing IP phone record by searching IP phone records of call control database 110 based on the new device identifier.

At 604, responsive to determining there is no existing IP phone record for the new IP phone, a secure connection is established between the call control entity and the new IP phone over communication network 106. Either the call control entity or the new IP phone may initiate establishment of the secure connection. Over the secure connection, the call control entity acquires from the new IP phone the directory number and, optionally, a user PIN associated with the user and the directory number. Call control entity 108 may acquire the directory number by: sending to the new IP phone a default configuration file configured to cause the new IP phone to generate/render a prompt to an operator of the new IP phone for the directory number (i.e., that solicits the directory number), and optionally for the user PIN; and receiving from the new IP phone the directory number, and optionally the user PIN, as entered at the new IP phone responsive to the prompt.

At 606, upon receiving the directory number, call control entity 108 searches for an existing IP phone record for the existing IP phone based on the directory number. In an example in which call control entity 108 includes multiple clusters that store respective pluralities of IP phone records, the call control entity searches the respective pluralities of IP phone records of the multiple clusters for the existing IP phone record based on the directory number.

At 608, when the existing IP phone record is found as a result of the search, call control entity 108 creates for the new IP phone a new IP phone record associated with the directory number, and copies existing IP phone configuration information from the existing IP phone record into the new IP phone record. The existing IP phone configuration information includes one or more of an IP phone button template, an IP phone soft-key template, IP phone default parameters, an IP phone profile, an IP phone recording profile, and a user identifier. Call control entity 108 also stores the directory number and the new MAC address in the new IP phone record.

At 610, call control entity 108 configures the new IP phone with the existing IP phone configuration information over the secure connection. For example, call control entity 108 sends the existing configuration entity to the new IP phone over the secure connection.

Figure 7:
FIG. 7 is an illustration of a user interface (UI) that shows a display prompt generated by the new IP phone responsive to UI information/instructions from the call control entity, according to an example embodiment.

With reference to FIG. 7, there is an illustration of an example UI 700 that shows a display prompt generated by new IP phone 304 responsive to execution of UI information/instructions from call control entity 108, as described above. The display prompt of UI 700 includes a prompt for entry of a directory number and a user PIN, which may be entered via a keypad of new IP phone 304.

Figure 8:
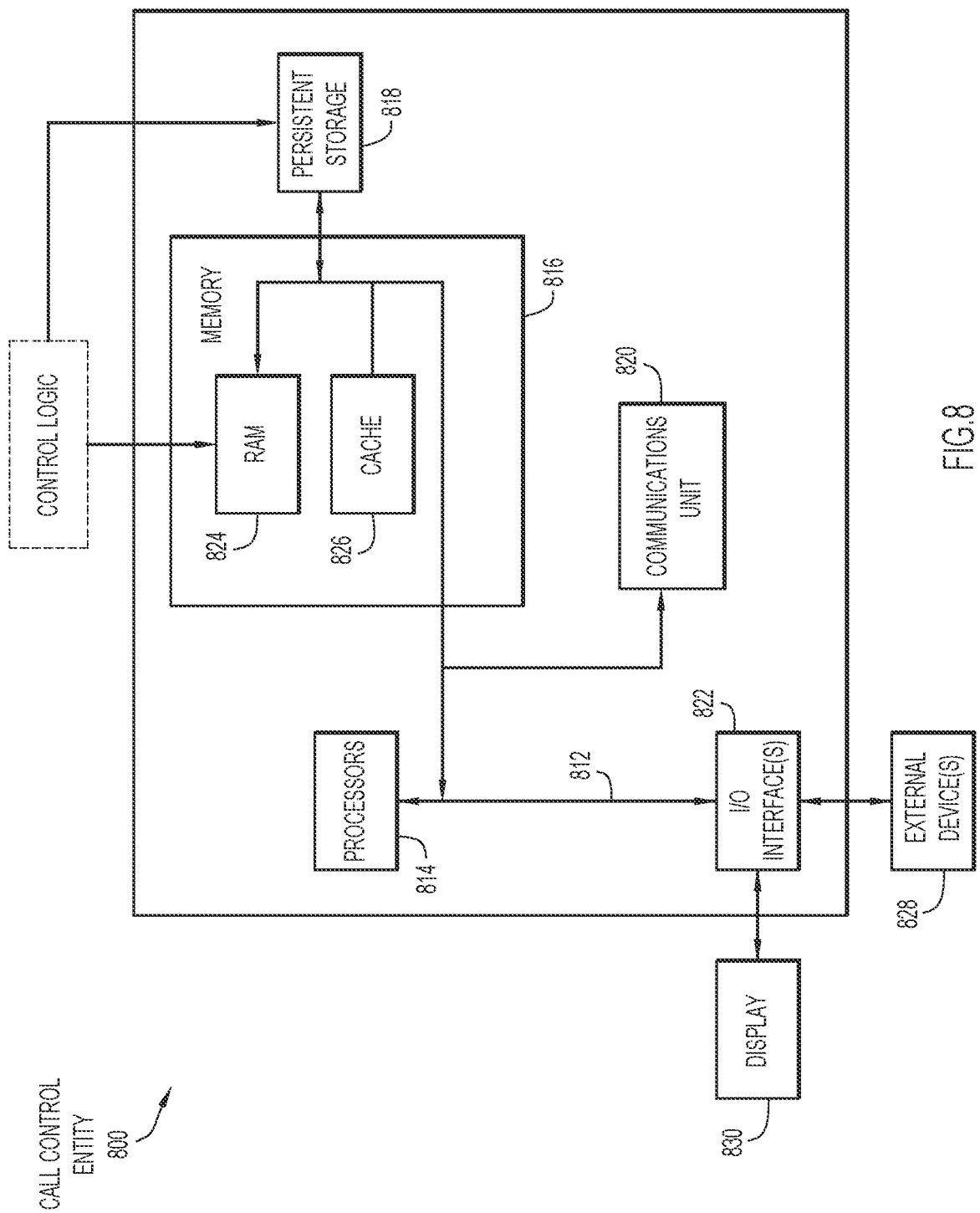
FIG. 8 is an illustration of a hardware block diagram of a computing device that may perform the functions of the call control entity, according to an example embodiment.

FIG. 8 illustrates a hardware block diagram of a computing device 800 that may perform the functions of call control entity 108 (or servers of the call control entity) referred to herein. It should be appreciated that FIG. 8 provides only an illustration of one embodiment and does not imply any limitations with regard to the environments in which different embodiments may be implemented. Many modifications to the depicted environment may be made.

As depicted, the device 800 includes a bus 812, which provides communications between computer processor(s) 814, memory 816, persistent storage 818, communications unit 820, and input/output (I/O) interface(s) 822. Bus 812 can be implemented with any architecture designed for passing data and/or control information between processors (such as microprocessors, communications and network processors, etc.), system memory, peripheral devices, and any other hardware components within a system. For example, bus 812 can be implemented with one or more buses.

Memory 816 and persistent storage 818 are computer readable storage media. In the depicted embodiment, memory 816 includes random access memory (RAM) 824 and cache memory 826. In general, memory 816 can include any suitable volatile or non-volatile computer readable storage media. Instructions for control logic may be stored in memory 816 or persistent storage 818 for execution by processor(s) 814. Execution of the control logic causes the processors to implement/perform the operations and methods of the various embodiments described herein, for example, operations associated with transactions 300, 400, 500, and method 600, for example.

One or more programs may be stored in persistent storage 818 for execution by one or more of the respective computer processors 814 via one or more memories of memory 816. The persistent storage 818 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 818 may also be removable. For example, a removable hard drive may be used for persistent storage 818. Other examples include optical and magnetic disks, thumb drives, and smart cards that are inserted into a drive for transfer onto another computer readable storage medium that is also part of persistent storage 818.

Communications unit 820, in these examples, provides for communications with other data processing systems or devices. In these examples, communications unit 820 includes one or more network interface cards (e.g., a network interface unit (NIU)). Communications unit 820 may provide communications through the use of either or both physical and wireless communications links.

I/O interface(s) 822 allows for input and output of data with other devices that may be connected to computer device 800. For example, I/O interface 822 may provide a connection to external devices 828 such as a keyboard, keypad, a touch screen, and/or some other suitable input device. External devices 828 can also include portable computer readable storage media such as database systems, thumb drives, portable optical or magnetic disks, and memory cards.

Software and data used to practice embodiments can be stored on such portable computer readable storage media and can be loaded onto persistent storage 818 via I/O interface(s) 822. I/O interface(s) 822 may also connect to a display 830. Display 830 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 9:
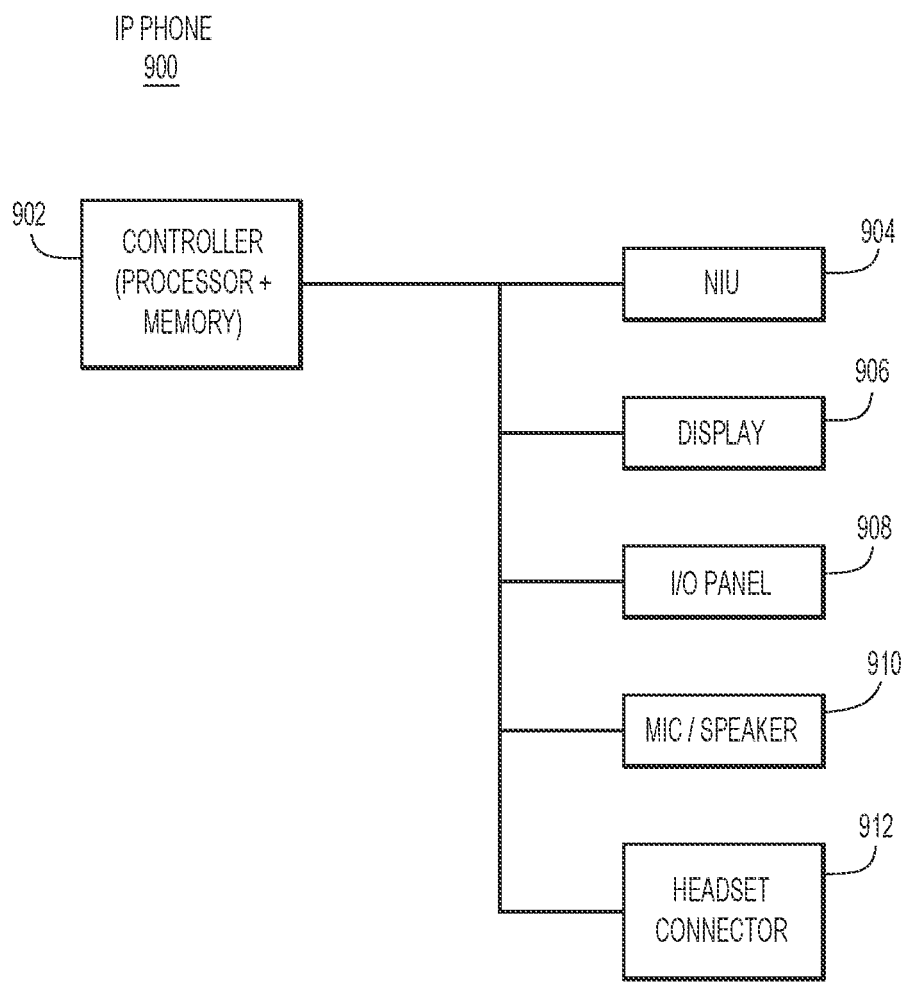
FIG. 9 is a high-level block diagram of an IP phone, according to an example embodiment.

With reference to FIG. 9, there is a high-level block diagram of an example IP phone 900 representative of any of IP phones 102, 302, and 304. IP phone 900 includes the following components that are electrically and communicatively coupled with each other: a controller 902, having a processor and memory, for controlling the IP phone; an NIU 904, which may include, e.g., an Ethernet card, to provide wired or wireless communications with a network, e.g., to send/receive data packets to/from the network; a display 906 for displaying information; an input/output (I/O) panel 908, such as a keypad, for entering information into the IP phone; microphone (MIC)/loudspeaker (SPKR) circuits 910, and an audio/signal connector 912 for a headset. The processor of controller 902 executes instructions of control logic stored in the associated memory to perform operations associated with a new IP phone that is to replace an existing IP phone, as described above.

In summary, embodiments presented herein use a directory number as a key to simplify IP phone replacement in a secure manner, which allows a back-end call control entity (e.g., call control server) to automatically create a new IP phone record for a new IP phone from/based on an existing IP Phone record for an existing IP phone, in a local database. This reduces administrator burden because, in part, it avoids pre-configuring IP phones on the call control entity. An advantage of the embodiments is that they do not use conventional unsecure auto-registration, and thus do not require the unsecure auto-registration to be enabled on the call control entity. The embodiments also avoid pre-configuring of IP phones on the call control entity. Moreover, the embodiment do not require new call control elements to be maintained and managed, and the call control entity itself, working with the new IP phone, can complete the IP phone replacement. In a scenario in which the telephony network is segregated into multiple clusters, the embodiments enable the call control entity to learn about a host cluster of a directory number, and the embodiments automatically re-direct the new IP Phone to the correct (home) cluster for IP phone replacement to complete. Also, user level security and audit logging is enabled by the embodiments. For example, based on configuration, a user may be prompted to enter a user PIN before the call control entity proceeds with the IP phone replacement.

In one aspect, a method is provided comprising: at a call control entity configured to communicate with Internet Protocol (IP) phones over a network: responsive to a configuration request from a new IP phone that is to replace an existing IP phone, determining there is no existing IP phone record for the new IP phone; responsive to the determining, acquiring from the new IP phone a directory number associated with a user and that is to be used when making calls with the new IP phone; searching for an existing IP phone record for the existing IP phone based on the directory number; when the existing IP phone record is found, creating for the new IP phone a new IP phone record associated with the directory number, and copying existing configuration information from the existing IP phone record to the new IP phone record; and configuring the new IP phone with the existing configuration information.

In another aspect, an apparatus is provided comprising: a network interface unit to communicate with Internet Protocol (IP) phones over a network; and a processor of a call control entity coupled to the network interface unit and configured to perform: responsive to a configuration request from a new IP phone that is to replace an existing IP phone, determining there is no existing IP phone record for the new IP phone; responsive to the determining, acquiring from the new IP phone a directory number associated with a user and that is to be used when making calls with the new IP phone; searching for an existing IP phone record for the existing IP phone based on the directory number; when the existing IP phone record is found, creating for the new IP phone a new IP phone record associated with the directory number, and copying existing configuration information from the existing IP phone record to the new IP phone record; and configuring the new IP phone with the existing configuration information.

In yet another aspect, a computer readable medium is provided. The computer readable medium is encoded with instructions that, when executed by a processor, cause the process or perform: responsive to a configuration request from a new IP phone that is to replace an existing IP phone, determining there is no existing IP phone record for the new IP phone; responsive to the determining, acquiring from the new IP phone a directory number associated with a user and that is to be used when making calls with the new IP phone; searching for an existing IP phone record for the existing IP phone based on the directory number; when the existing IP phone record is found, creating for the new IP phone a new IP phone record associated with the directory number, and copying existing configuration information from the existing IP phone record to the new IP phone record; and configuring the new IP phone with the existing configuration information.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    at a call control entity configured to communicate with Internet Protocol (IP) phones over a network:
        responsive to a configuration request from a new IP phone that is to replace an existing IP phone, determining there is no existing IP phone record for the new IP phone;
        responsive to the determining, acquiring from the new IP phone a directory number associated with a user and that is to be used when making calls with the new IP phone;
        searching for an existing IP phone record for the existing IP phone based on the directory number;
        when the existing IP phone record is found, creating for the new IP phone a new IP phone record associated with the directory number, and copying existing configuration information from the existing IP phone record to the new IP phone record; and
        configuring the new IP phone with the existing configuration information.

2. The method of claim 1, wherein:
    the configuration request includes a new device identifier of the new IP phone that differs from an existing device identifier of the existing IP phone; and
    the determining includes determining there is no existing IP phone record associated with the new device identifier.

3. The method of claim 2, wherein the new device identifier includes a media access control (MAC) address of the new IP phone and the existing device identifier includes a MAC address of the existing IP phone.

4. The method of claim 1, wherein the acquiring includes:
    sending to the new IP phone a default configuration file configured to cause the new IP phone to generate a prompt soliciting the directory number;
    establishing with the new IP phone a secure connection over the network; and
    receiving the directory number from the new IP phone over the secure connection.

5. The method of claim 4, wherein:
    the acquiring further includes acquiring from the new IP phone over the secure connection a personal identification number (PIN) for the user; and
    conditioning access to the existing IP phone record based on the PIN.

6. The method of claim 4, wherein the default configuration file is configured to direct the new IP phone to a uniform resource locator (URL) for a service from which the new IP phone is able to download user interface (UI) instructions for generating the prompt.

7. The method of claim 1, wherein the configuring the new IP phone includes configuring the new IP phone without performing unsecure auto-registration of the new IP phone in which the call control entity assigns a directory number to the IP phone.

8. The method of claim 1, wherein the configuring the new IP phone includes:
    receiving a second configuration request from the new IP phone and, responsive thereto, sending the existing configuration information to the new IP phone.

9. The method of claim 1, wherein the existing configuration information includes one or more of an IP phone button template, an IP phone soft-key template, IP phone default parameters, an IP phone profile, an IP phone recording profile, and a user identifier.

10. The method of claim 1, further comprising, prior to receiving the configuration request:
    receiving from the new IP phone a request for firmware; and responsive to the request, sending the firmware to the new IP phone.

11. The method of claim 1, further comprising:
after the configuring, performing session initiation protocol (SIP) registration of the new IP phone.

12. The method of claim 1, wherein the call control entity includes multiple clusters that store respective pluralities of IP phone records, and the method further comprises:
searching the respective pluralities of IP phone records of the multiple clusters for the existing IP phone record based on the directory number.

13. The method of claim 1, further comprising:
automatically adjusting configuration settings of the existing configuration information to suit the new IP phone.

14. An apparatus comprising:
a network interface unit to communicate with Internet Protocol (IP) phones over a network; and
a processor of a call control entity coupled to the network interface unit and configured to perform:
responsive to a configuration request from a new IP phone that is to replace an existing IP phone, determining there is no existing IP phone record for the new IP phone;
responsive to the determining, acquiring from the new IP phone a directory number associated with a user and that is to be used when making calls with the new IP phone;
searching for an existing IP phone record for the existing IP phone based on the directory number;
when the existing IP phone record is found, creating for the new IP phone a new IP phone record associated with the directory number, and copying existing configuration information from the existing IP phone record to the new IP phone record; and
configuring the new IP phone with the existing configuration information.

15. The apparatus of claim 14, wherein:
the configuration request includes a new device identifier of the new IP phone that differs from an existing device identifier of the existing IP phone; and
the processor is configured to perform the determining by determining there is no existing IP phone record associated with the new device identifier.

16. The apparatus of claim 14, wherein the processor is configured to perform the acquiring by:
sending to the new IP phone a default configuration file configured to cause the new IP phone to generate a prompt soliciting the directory number;
establishing with the new IP phone a secure connection over the network; and
receiving the directory number from the new IP phone over the secure connection.

17. The apparatus of claim 16, wherein:
the acquiring further includes acquiring from the new IP phone over the secure connection a personal identification number (PIN) for the user; and
conditioning access to the existing IP phone record based on the PIN.

18. A processor readable medium encoded with instructions that, when executed by a processor of a call control entity configured to communicate with Internet Protocol (IP) phones over a network, cause the processor to perform:
responsive to a configuration request from a new IP phone that is to replace an existing IP phone, determining there is no existing IP phone record for the new IP phone;
responsive to the determining, acquiring from the new IP phone a directory number associated with a user and that is to be used when making calls with the new IP phone;
searching for an existing IP phone record for the existing IP phone based on the directory number;
when the existing IP phone record is found, creating for the new IP phone a new IP phone record associated with the directory number, and copying existing configuration information from the existing IP phone record to the new IP phone record; and
configuring the new IP phone with the existing configuration information.

19. The processor readable medium of claim 18, wherein:
the configuration request includes a new device identifier of the new IP phone that differs from an existing device identifier of the existing IP phone; and
the instructions to cause the processor to perform the determining include instructions to cause the processor to perform determining there is no existing IP phone record associated with the new device identifier.

20. The processor readable medium of claim 18, wherein the instructions to cause the processor to perform the acquiring include instructions to cause the processor to perform:
sending to the new IP phone a default configuration file configured to cause the new IP phone to generate a prompt soliciting the directory number;
establishing with the new IP phone a secure connection over the network; and
receiving the directory number from the new IP phone over the secure connection.

* * * * *